Figure 1:
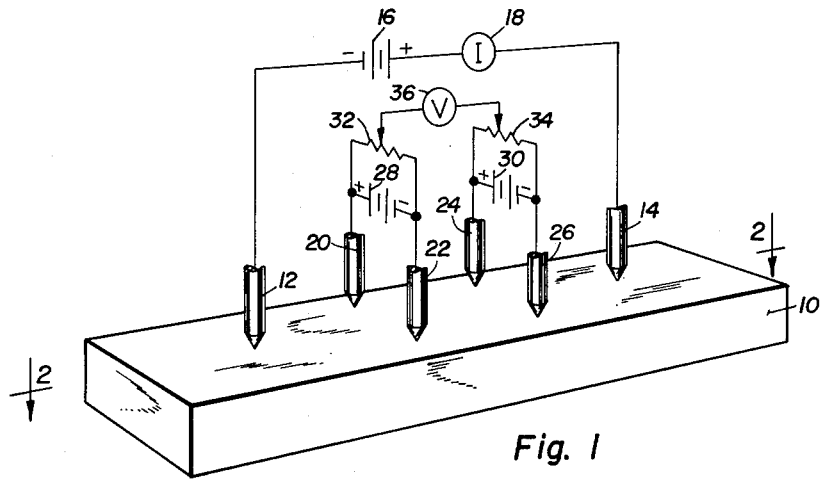

May 19, 1964    T. B. HUTCHINS IV, ET AL    3,134,077
ELECTRICAL PROBE APPARATUS FOR MEASURING THE
CHARACTERISTICS OF SEMICONDUCTOR MATERIAL
Filed Sept. 18, 1961

INVENTORS.
THOMAS B. HUTCHINS IV
WILLIAM C. MYERS
JEAN F. DELORD
BY
BUCKHORN, CHEATHAM & BLORE
ATTORNEYS

United States Patent Office 3,134,077
Patented May 19, 1964

3,134,077
ELECTRICAL PROBE APPARATUS FOR MEASURING THE CHARACTERISTICS OF SEMICONDUCTOR MATERIAL
Thomas B. Hutchins IV, Beaverton, William C. Myers, Hillsboro, and Jean F. Delord, Portland, Oreg., assignors to Tektronix, Inc., Beaverton, Oreg., a corporation of Oregon
Filed Sept. 18, 1961, Ser. No. 138,688
7 Claims. (Cl. 330—2)

The present invention relates generally to movable electrical connections and specifically includes probe contact apparatus for measuring the electrical characteristics of semiconductor material.

The apparatus of the present invention may be utilized with great advantage in the measurement of various parameters of semiconductor material, such as current carrier mobility, injected minority carrier lifetime, carrier concentration, etc., and is particularly useful in determining the electrical resistivity of the semiconductor material. It has been proposed that the resistivity of semiconductor material can be determined by flowing a small current through the semiconductor sample from an external current source and measuring the resulting voltage drop across the region of such sample whose resistivity is to be determined. This resistivity $\rho$ can then be computed by the formula $$\rho = \frac{V}{I} \times \frac{A}{L}$$

where V and I are the measured voltage and current and A and L are the cross-sectional area and length of the portion of the semiconductor sample being measured, providing such sample has a uniform cross-sectional area throughout such portion. Previous measuring devices for obtaining the voltage drop measurement use merely a voltmeter and two pointed probes which are moved along the semiconductor sample to measure the voltage drop between two points on such sample. However, this probe measuring apparatus produces a rectifying contact between the probes and the semiconductor material so that such connections are, in effect, point contact diodes. Such rectifying connections produce substantial errors of unknown value into the above formula since the reading of the voltmeter is actually an indication of the voltage drop across the sample of semiconductor material and across the two rectifying connections formed by such probes. This error can be corrected by the use of large area soldered or plated contacts in place of the voltmeter probes to form ohmic connections with the semiconductor material. However, such a solution has the disadvantage that such plated contacts can not be moved over the surface of the semiconductor sample so that it can only give an average value of resistivity, and not actual values when there is a significant variation of resistivity throughout the sample.

A four probe method of measuring the resistivity of semiconductor material has been proposed in which four pointed probes positioned in a straight line contact a flat surface of a member of semiconducting material. Alternating current (I) is caused to flow between the two end probes. This current and the voltage (V) between the two inner probes is measured. If the member of semiconductor material is large compared to the spacing between the probes and such spacing between each pair of adjacent probes is the same and equal to S, then the resistivity in the neighborhood of the probes is $$\rho_0 = \frac{V}{I} 2\pi S$$

This formula can be applied to smaller members of semiconductor material by multiplying the right hand member thereof by a correction factor depending upon the size and shape of the member. This method of measuring resistance is however, also subject to the same type of errors discussed above since the rectifying effects of the point contact connections provided by the inner probes also introduce unknown errors similar to those previously discussed.

The probe apparatus of the present invention overcomes the above disadvantages of previous resistivity measuring apparatus in that it produces a movable electrical contact having the characteristics of an ohmic contact. Briefly, the probe apparatus of the invention includes a first pair of probe contacts supported in spaced relationship so that they are spaced from each other by a sufficient distance to form a pair of separate point-contact diodes when placed in contact with the semiconductor material whose resistivity is to be measured. A first voltage source is connected between such first pair of probe contacts and a first potentiometer is connected at its end terminals across such first voltage source between such first pair of probe contacts. A second pair of probe contacts, similar to the first pair of probes, is connected to a second voltage source and a second potentiometer in the same manner as such first pair. A voltage measuring instrument is connected between the movable contacts of the first and second potentiometers. When the potentiometers are properly adjusted and sufficient current flows through each pair of probe contacts due to the voltage sources described above to cause the reversely biased diodes of each pair to operate on the linear portions of their characteristic curves, each pair of probe contacts, in effect, forms a combined connection having the characteristics of a single ohmic connection. The voltage difference between the movable contacts of such potentiometers, as indicated by a voltmeter, is then a linear function of the current through and resistivity of the semiconductor sample adjacent the probes.

Therefore, one object of the present invention is to provide movable electrical connections to semiconductor material which have the characteristics of ohmic connections.

Another object of the invention is to provide a pair of probe contacts which have the characteristics of a single ohmic connection to semiconductor material.

A further object of the present invention is to provide an apparatus for measuring the electrical characteristics of semiconductor material in which a first pair of probe contacts forming a connection with such semiconductor material having the characteristics of a single ohmic connection are employed in conjunction with a second pair of probe contacts similar to such first pair of probe contacts and a voltage indicating device connected between the first and second pairs of probe contacts to measure the voltage difference between such first and second pairs of probe contacts.

Still another object of the present invention is to provide an apparatus for measuring the resistivity of semiconductor material, in which two pairs of probe contacts, each pair having the probes thereof spaced from each other so that they form two separate point-contact diodes when placed in contact with such semiconductor material, with a separate voltage source connected between the probes of each such two pairs of probe contacts, and a separate potentiometer connected across each of such voltage sources, are employed in conjunction with a voltage measuring instrument connected between the movable contacts of such potentiometers and a third pair of probes connected to a current source and supported so that such first two pairs of probes are positioned therebetween and separated therefrom by a distance substantially greater than the space between the probes forming such first two pairs to enable the resistivity of the semiconductor material adjacent said probes to be determined from the voltage indicated by such instrument and the current flowing between the third pair of probes.

Figure 2:
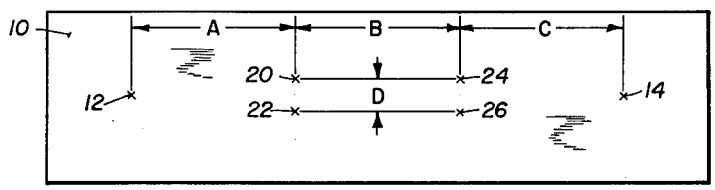
Figure 3:
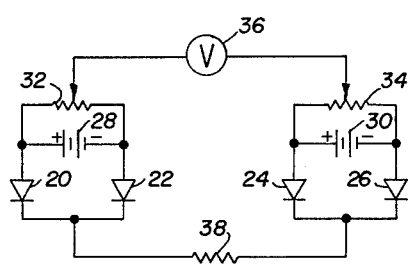

Additional objects and advantages of the present invention will become apparent after referring to the following detailed description of a preferred embodiment thereof and to the attached drawings of which:

FIG. 1 is a diagrammatic view of one embodiment of the probe contact apparatus of the present invention used for measuring the resistivity of semiconductor material, FIG. 2 is a sectional view along line 2—2 of FIG. 1, showing the relative positions of the probe contacts, and FIG. 3 is a schematic diagram of the electrical circuit formed by part of the apparatus of FIG. 1.

Although the probe contact apparatus of the present invention may be used for measuring other electrical characteristics, the preferred emobdiment shown in FIG. 1 is directed to an apparatus for measuring the resistivity of semiconductor material, such as germanium or silicon. This apparatus may be a four point resistivity measuring system in which the electrical contacts are all of the probe type that can be moved along the surface of a body 10 of semiconductor material whose resistivity is to be measured. The semiconductor body 10 may be formed with a non-uniform cross-section and such body may be of any semiconductor material including one containing donor or acceptor impurities therein to an extent that there is a significant variation of resistivity throughout the sample body. A pair of outer probes 12 and 14 are supported in spaced relationship when in contact with the surface of body 10 and connected to a source of electrical current 16, either A.C. or D.C., in series with a current indicating device 18, such as an ammeter. These two outer probes 12 and 14 form two of the points of the four point resistivity measuring apparatus, while the remaining two points are formed by two pairs of inner probes 20, 22 and 24, 26. All of the above probes may be similar in construction and may consist of pointed cylindrical rods of hard conducting material, such as steel or tungsten. The first pair of inner probes 20 and 22 are inter-connected to a suitable source 28 of A.C. or D.C. voltage. The second pair of inner probes 24 and 26 are connected in the same manner to a similar voltage source 30. A first voltage divider 32, which may be in the form of a potentiometer, is connected at its end terminals across voltage source 28 to probes 20 and 22, while a second voltage divider or potentiometer 34 is connected with its end terminals across voltage source 30 to probes 24 and 26. The movable contacts of potentiometers 32 and 34 are connected to the opposite terminals of a voltage indicating device 36, such as a voltmeter, which indicates the voltage difference between first pair of probes 20, 22 and second pair of probes 24, 26.

The relative positions of the probe contacts on semiconductor body 10 may be as shown in FIG. 2, which illustrates one arrangement of such probes. Each probe forming the first and second pairs of inner probes are separated by a spacing distance D which is much greater than the sum of the diffusion lengths of the minority carriers introduced into the semiconductor material by the point contacts of each of the two probes forming such pairs inner probes. This distance D must be sufficient so that the point-contact diodes formed by each of these probes 20, 22, 24 and 26 with the semiconductor body 10 are separate and do not overlap, in order to form four separate diodes. The first pair 20, 22 of inner probes must be separated by a distance B from the second pair 24, 26 of inner probes so that this separation distance B is substantially greater than the spacing distance D in order to accurately measure the resistivity of the semiconductor material in the region B between the first pair and second pair of inner probes. As shown in FIG. 2, probes 20, 22, 24 and 26 are preferably positioned at the corners of a rectangle having a length B and a width D. The outer probes 12 and 14 are positioned outside such rectangle on a line which intersects the midpoints of the sides of such rectangle having the length D so as to be equidistant from the probes 20 and 22, and equidistant from probes 24 and 26.

The outer probe 12 may be positioned a distance A from inner probes 20 and 22, while outer probe 14 is positioned a distance C from inner probes 24 and 26, which distances are both substantially greater than the distance D. If distances A, B and C are made equal to a predetermined value S, the resistivity of the region of semiconductor material being measured can be obtained by the formula $$\rho_0 = \frac{V}{I} \times 2\pi S$$

multiplied by a correction factor which depends upon the geometry of the sample, where V and I are the readings of voltmeter 36 and ammeter 18, respectively. Therefore, the resistivity may be easily calculated by dividing the voltmeter reading by the ammeter reading and multiplying by a predetermined constant.

As shown in FIG. 3, each individual probe 20, 22, 24 and 26 of the first and second inner pairs of probes can be considered as a separate point-contact diode which has the polarity indicated when body 10 is formed of N-type semiconductor material. The first pair of diodes 20 and 22 are connected in back-to-back relationship, as are the second pair of diodes 24 and 26, with the cathodes of such first pair of diodes connected to the cathodes of such second pair of diodes through a resistor 38 which represents the resistance of semiconductor body 10 in the region indicated by the distance B. When the voltage sources 28 and 30 have the polarity indicated, diodes 20 and 24 are forwardly biased, and diodes 22 and 26 are reverse biased. Thus, the amount of reference current flowing between diodes 20 and 22 due to voltage source 28 is limited to the reverse bias current of diode 22 and the amount of reference current flowing from diode 24 to diode 26 from voltage source 30 is limited to the reverse bias current of diode 26.

The operation of the probe apparatus of the present invention may include first adjusting the movable contact on potentiometers 32 and 34 until a null reading is obtained on the voltmeter 36 with no current flowing through semiconductor body 10 from current source 16 as indicated by a zero reading on ammeter 18. Next, a small measuring current is allowed to flow through the semiconductor body 10 from current source 16 through probe contacts 12 and 14 while maintaining the movable contacts on potentiometers 32 and 34 in the position required for the initial null reading on voltmeter 36. Voltmeter and ammeter readings are then taken, and the voltage and current is substituted in the above formula to compute the resistivity of this B region of the semiconductor body. This procedure eliminates the error introduced into previous apparatus by the rectifying contacts at the inner probes connected to the voltmeter, because the current flowing in each pair of inner probes due to voltage sources 28 and 30 when the voltmeter 36 indicates a null voltage reading, establishes a fixed relationship between the semiconductor body 10 and such probe contacts, which is maintained by leaving the movable contacts of potentiometers 32 and 34 in their null positions. The voltage difference between the movable contacts of potentiometers 32 and 34, as indicated by voltmeter 36, is then a linear function of the current and resistivity of the semiconductor body 10 in the region of resistivity being measured because the small measuring current from source 16 causes very little change in voltage across the point-contact diodes formed by such probes.

The above procedure of measuring resistivity may be varied so that a null or other initial reading on voltmeter 36 is obtained with a fixed initial measuring current flowing from source 16 through semiconductor body 10 and ammeter 18. The measuring current from source 16 to semiconductor body 10 between probes 12 and 14 is then changed from its initial value and the voltmeter and ammeter readings are taken again. The differences between the initial and final voltage and current readings are then determined and such differences used in the above formula. Also, it should be understood that the probe contacts 12 and 14 may be attached to the semiconductor body 10 by plating large area ohmic contacts on the end thereof for modified resistance measuring procedures. For example, the contacts 12 and 14 need not be movable to obtain an accurate measure of resistivity when the semiconductor body 10 has a uniform cross-sectional area over its entire length. However, even in the conventional four probe resistance measuring procedure specifically described above, the rectifying junctions formed by probe contacts 12 and 14 cause no error in the resistivity measurement since the voltage difference is measured between the inner probes so that outer probes 12 and 14 need not produce ohmic contacts with body 10. In addition to the four point or six probe resistivity measuring apparatus shown in FIG. 1, the present invention may also be used in a two point system by eliminating outside probes 12 and 14, and placing current source 16 and ammeter 18 in series with voltmeter 36 between potentiometers 32 and 34. Also, while D.C. sources of potential have been described, A.C. sources can be employed with instruments reading peak A.C. values. In any event, the voltage measuring instruments should have high resistance compared to the resistance of the material being measured.

It will be obvious to one having ordinary skill in the art that other variations may be made in the details of the preferred embodiment of the present invention described above without departing from the spirit of the invention. Therefore, the scope of the present invention should be determined only from the following claims.

We claim:

1. Apparatus for making movable electrical connections to semiconductor material which have characteristics of ohmic connections, comprising:
   a first pair of contact probes electrically connected together and supported in spaced relationship so that they are spaced from each other by a distance sufficient to form two separate non-ohmic contacts with said semiconductor material,
   a second pair of contact probes similar to said first pair of probes connected to said first pair of probes and separated therefrom by a distance substantially greater than said spacing distance,
   means to produce a first electrical current between each of said first pair of probes and a second electrical current between each of said second pair of probes when said probes are placed in contact with said semiconductor material in order to form a single ohmic connection with each of said pairs of probes, and
   electrical measuring means connected between said first pair and said second pair of probes.

2. Apparatus for making movable electrical connections to semiconductor material which have characteristics of ohmic connections, comprising:
   a first pair of movable probes electrically connected together and supported in spaced relationship so that they form two separate rectifying contacts with said semiconductor material when placed in engagement therewith,
   a second pair of movable probes connected together and supported with a spacing distance similar to said first pair of probes, said second pair of probes being connected to said first pair of probes and separated therefrom by a distance substantially greater than said spacing distance,
   means to produce a first electrical current between each of said first pair of probes and a second electrical current between each of said second pair of probes when said probes are placed in contact with said semiconductor material,
   means to produce the flow of a third current in said semiconductor material through the portion of the semiconductor material located between said first pair and said second pair of probes, and
   means to measure the voltage difference between said first pair and said second pair of probes caused by said third current.

3. Apparatus for making movable electrical probe connections to semiconductor material which have the characteristics of ohmic connections, comprising:
   a first pair of movable contact probes electrically connected together and supported in spaced relationship so that they form two separate point-contact type diodes with said semiconductor material,
   a second pair of movable contact probes similar to said first pair of probes connected to said first pair of probes and separated therefrom by a distance substantially greater than said spacing distance,
   means to produce a first electrical current between each probe of said first pair of probes and a second electrical current between each probe of said second pair of probes when said probes are placed in contact with said semiconductor material,
   means to indicate the voltage difference between said first pair and said second pair of probes, and
   means to vary said voltage difference so that it may be reduced to a minimum.

4. Apparatus for measuring the electrical characteristics of semiconductor material comprising:
   a first pair of contacts supported in spaced relationship so that they are spaced from each other by a sufficient distance to form a pair of separate point-contact diodes with said semiconductor material,
   a first voltage source connected between said first pair of contacts,
   a first voltage divider connected at its end terminals across such first voltage source between said first pair of contacts,
   a second pair of contacts similar to said first pair of contacts separated from said first pair by a distance which is substantially greater than said spacing distance,
   a second voltage source connected between said second pair of contacts,
   a second voltage divider connected at its end terminals across said second voltage source between said second pair of contacts, and
   means connected between the intermediate terminals of said first and said second voltage dividers to indicate the voltage difference between said first pair and said second pair of contacts.

5. Apparatus for measuring the resistivity of semiconductor material comprising:
   a first pair of movable probe contacts supported in spaced relationship so that they are spaced from each other by a sufficient distance to form two separate point-contact type diodes when placed in contact with said semiconductor material,
   a first voltage source connected between said first pair of probe contacts,
   a first variable ratio potentiometer connected at its fixed terminals across such first voltage source between said first pair of probe contacts,
   a second pair of movable probe contacts similar to said first pair of probe contacts separated from said first pair by a distance which is substantially greater than said spacing distance between each contact of said pair of contacts,
   a second voltage source connected between said second pair of probe contacts, a second variable ratio potentiometer connected at its fixed terminals across said second voltage source between said second pair of probe contacts, and a voltmeter connected between the movable contacts of said first and said second potentiometers to indicate the voltage difference between said first pair and said second pair of probe contacts.

6. Apparatus for measuring the electrical properties of semiconductor material comprising:

a first pair of probe contacts supported in spaced relationship so that they are spaced from each other by a sufficient distance to form two separate point-contact diodes when placed in contact with said semiconductor material, a first voltage source connected between said first pair of probe contacts, a first potentiometer connected by its fixed end terminals across such first voltage source between said first pair of probe contacts, a second pair of probe contacts similar to said first pair of probe contacts separated from said first pair of contacts by a distance which is substantially greater than said spacing distance, a second voltage source connected between said second pair of probe contacts, a second potentiometer connected by its fixed end terminals across said second voltage source between said second pair of probe contacts, means connected between the movable contacts of said first and said second potentiometers to indicate the voltage difference between said first pair and said second pair of probe contacts, a third pair of contacts supported so that said first pair and said second pair of contacts are positioned between said third pair of contacts and separated from each of said third pair of contacts by a distance substantially greater than said spacing distance, a source of electrical current connected between said third pair of contacts, and means connected to said third pair of contacts for indicating the current flow through said third pair of contacts.

7. Apparatus for measuring the resistivity of semiconductor material comprising:

a first pair of probe contacts supported in spaced relationship so that they are spaced from each other by a sufficient distance to form a pair of separate point-contact diodes when placed in contact with said semiconductor material, a first voltage source connected between said first pair of probe contacts to produce a first current in said first pair of contacts, a first potentiometer connected by its fixed end terminals in parallel with such first voltage source and in series with said first pair of probe contacts, a second pair of probe contacts similar to said first pair of probe contacts separated from said first pair of contacts by a distance which is substantially greater than said spacing distance, a second voltage source connected between said second pair of probe contacts to produce a second current in said second pair of contacts substantially the same as said first current, a second potentiometer connected by its fixed end terminals in parallel with said second voltage source and in series with said second pair of probe contacts, a voltmeter connected between the movable contacts of said first and said second potentiometers to indicate the voltage difference between said first pair and said second pair of probe contacts, a third pair of probe contacts supported so that said first pair and said second pair of contacts are positioned between said third pair of contacts on said semiconductor material and separated from each of said third pair of contacts by a distance substantially greater than said spacing distance, a source of electrical current connected between said third pair of probe contacts to produce a third current in said semiconductor material which is substantially less than said first or second currents, and an ammeter connected to said third pair of contacts for indicating the current flow through such third pair of contacts.

No references cited.